United States Patent
Lazzouni et al.

(10) Patent No.: US 9,940,925 B2
(45) Date of Patent: Apr. 10, 2018

(54) SIGHT-TO-SPEECH PRODUCT AUTHENTICATION

(71) Applicant: Authentix, Inc., Addison, TX (US)

(72) Inventors: Mohamed Lazzouni, Addison, TX (US); Will Ewin, Addison, TX (US)

(73) Assignee: Authentix, Inc., Addison, TX (US)

( * ) Notice: Subject to any disclaimer, the term of this patent is extended or adjusted under 35 U.S.C. 154(b) by 0 days.

(21) Appl. No.: 15/186,173

(22) Filed: Jun. 17, 2016

(65) Prior Publication Data
US 2017/0287466 A1   Oct. 5, 2017

Related U.S. Application Data

(60) Provisional application No. 62/314,730, filed on Mar. 29, 2016.

(51) Int. Cl.
| | |
|---|---|
| *G10L 15/00* | (2013.01) |
| *G10L 15/01* | (2013.01) |
| *G10L 25/72* | (2013.01) |
| *G10L 15/10* | (2006.01) |
| G10L 15/22 | (2006.01) |

(52) U.S. Cl.
CPC .............. *G10L 15/01* (2013.01); *G10L 15/10* (2013.01); *G10L 25/72* (2013.01); *G10L 2015/225* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 6,049,768 A | * | 4/2000 | Goldberg | G10L 17/24 704/231 |
| 8,534,544 B1 | * | 9/2013 | Eker | G06K 17/0022 235/375 |
| 2005/0267754 A1 | * | 12/2005 | Schultz | G10L 15/10 704/252 |
| 2006/0165260 A1 | * | 7/2006 | Vanjani | G06Q 30/018 705/317 |

(Continued)

OTHER PUBLICATIONS

Filing Receipt and Specification of U.S. Appl. No. 62/314,730, filed Mar. 29, 2016.

*Primary Examiner* — Jesse Pullias
(74) *Attorney, Agent, or Firm* — Conley Rose, P.C.; Rodney B. Carroll

(57) ABSTRACT

An apparatus comprises: a memory; and a processor coupled to the memory and configured to: receive a spoken phrase associated with a printed phrase from a tamper-evident component of a product; obtain a notification associated with authentication of the product based on the spoken phrase; and provide the notification in a visual manner, in an audio manner, or a combined audio and visual manner. A method comprises: creating a tamper-evident component comprising an obscuring mechanism and a printed phrase, wherein the obscuring mechanism obscures the printed phrase from view; providing the tamper-evident component for integration into a product; receiving a spoken phrase from a first consumer; analyzing the spoken phrase; generating a notification associated with authentication of the product based on the analyzing; and transmitting the notification to the first consumer.

27 Claims, 9 Drawing Sheets

(56) References Cited

U.S. PATENT DOCUMENTS

| | | | |
|---|---|---|---|
| 2015/0076218 A1* | 3/2015 | Wood | G06Q 99/00 235/375 |
| 2015/0178521 A1* | 6/2015 | Ching | G06K 5/00 235/375 |
| 2015/0206532 A1* | 7/2015 | Fujisawa | G10L 15/22 704/251 |
| 2016/0072626 A1* | 3/2016 | Kouladjie | G06F 21/36 713/189 |
| 2017/0032382 A1* | 2/2017 | Shulman | G06Q 30/06 |

* cited by examiner

SIGHT-TO-SPEECH PRODUCT AUTHENTICATION

CROSS-REFERENCE TO RELATED APPLICATIONS

This application claims priority to U.S. Prov. Patent App. No. 62/314,730 filed on Mar. 29, 2016 by Will Ewin et al. and Mohamed Lazzouni and titled "Vox Authorization," which is incorporated by reference herein in its entirety.

TECHNICAL FIELD

Generally, the present disclosure relates to product authentication. More specifically, the present disclosure relates to product authentication using sight and speech.

BACKGROUND

Authentication is a process of confirming an identity of a person or thing. Authentication has applications in computing, information, manufacturing, packaging, human physical access, and consumer products. Authentication varies in its effectiveness. On one end of a spectrum, some forms of authentication can ensure absolute or near-absolute authenticity. On another end of the spectrum, some forms of authentication can ensure less than absolute authenticity or an acceptable level of authenticity. The tradeoff between the two ends of the spectrum may depend on complexity, ease of use, and cost.

SUMMARY

The present invention relates to apparatuses, systems, and methods for sight-to-speech product authentication. Aspects and embodiments of the invention are set forth in the claims.

In one embodiment, the disclosure includes an apparatus comprising: a memory; and a processor coupled to the memory and configured to: receive a spoken phrase associated with a printed phrase from a tamper-evident component of a product; obtain a notification associated with authentication of the product based on the spoken phrase; and provide the notification in a visual manner, in an audio manner, or a combined audio and visual manner.

In another embodiment, the disclosure includes a method comprising: creating a tamper-evident component comprising an obscuring mechanism and a printed phrase, wherein the obscuring mechanism obscures the printed phrase from view; providing the tamper-evident component for integration into a product; receiving a spoken phrase from a first consumer; analyzing the spoken phrase; generating a notification associated with authentication of the product based on the analyzing; and transmitting the notification to the first consumer.

In yet another embodiment, the disclosure includes an apparatus comprising: a memory; and a processor coupled to the memory and configured to: instruct recordation of a printed phrase from a tamper-evident component of a product; associate a label with the printed phrase, wherein the label indicates whether the printed phrase has or has not been consumed; instruct recordation of the label; receive a spoken phrase from a first consumer; perform an analysis of the spoken phrase; generate a notification associated with authentication of the product based on the analysis; and transmit the notification to the first consumer.

In yet another embodiment, the disclosure includes a computer program product comprising computer executable instructions stored on a non-transitory medium that when executed by a processor cause an apparatus to: receive a spoken phrase associated with a printed phrase from a tamper-evident component of a product; obtain a notification associated with authentication of the product based on the spoken phrase; and provide the notification in a visual manner, in an audio manner, or a combined audio and visual manner.

These and other features will be more clearly understood from the following detailed description taken in conjunction with the accompanying drawings and claims.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An important area of authentication is consumer product authentication. When consumers purchase name brand products, they typically do so with an expectation of a level of quality associated with the name brand product company. However, some companies that are not name brand product companies manufacture counterfeit products that imitate name brand products. Such counterfeit products typically do not have the same level of quality as the name brand products. It is therefore desirable for consumers to be able to authenticate that products are, in fact, the desired name brand products. It is also desirable to authenticate the name brand products in a manner that does not significantly add to their cost. When consumers are confident that the products they purchase are authentic and have an expected level of quality, the consumers may become more loyal to the product company making those products.

Disclosed herein are embodiments for product authentication. The embodiments implement sight-to-speech product authentication. Specifically, a consumer obtains a product with a tamper-evident component such as a scratch-off coating. If another person alters the tamper-evident component, then the tampering is visually evident to the consumer. Otherwise, the consumer removes an obscuring mechanism from the tamper-evident component of the product, speaks a phrase or code revealed by the removal, and receives an authentication result from a smart device based on the spoken phrase. The embodiments provide sufficient authentication without requiring excessive resources. For instance, the tamper-evident component may not require a unique printing surface, a unique ink, user authentication (e.g. PIN numbers, biometric readers, etc.) or other costly components.

Figure 1:
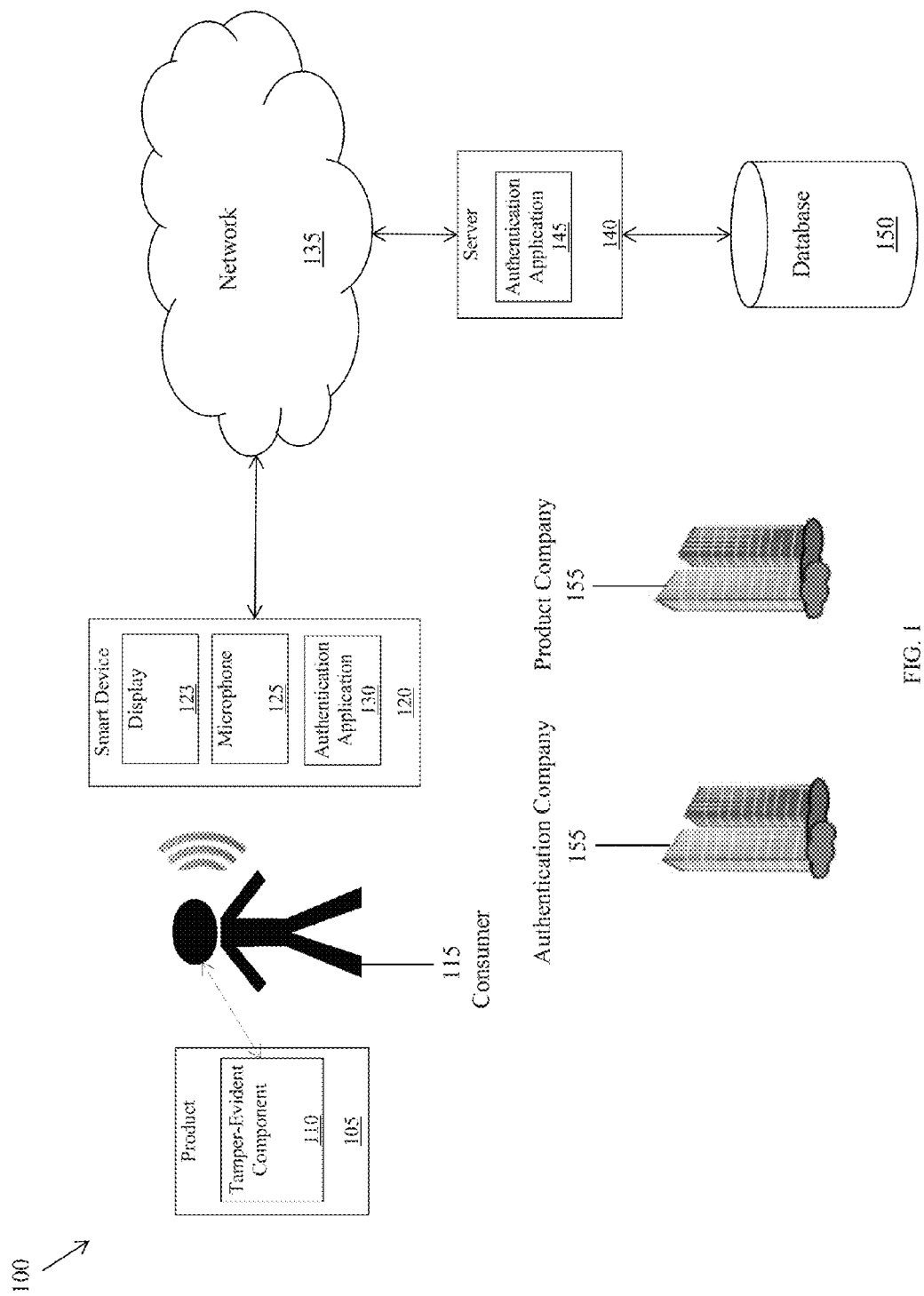
FIG. 1 is a schematic diagram of authentication system according to an embodiment of the disclosure.

FIG. 1 is a schematic diagram of authentication system 100 according to an embodiment of the disclosure. The system 100 comprises a product 105, a consumer 115, a smart device 120, a network 135, a server 140, a database 150, a product company 155, and an authentication company 160. The product company 155 and the authentication company 160 may be the same company. The system 100 is simplified for ease of understanding and may therefore comprise additional components not shown.

The product 105 is any suitable consumer product. For instance, the product 105 is a purse, an article of clothing, or an electronic good. The product 105 comprises a tamper-evident component 110. The product company 155 creates the product 105 or purchases the product 105 from a third-party manufacturer that creates the product 105.

The tamper-evident component 110 comprises an obscuring mechanism and a phrase (e.g., a word phrase, text phrase, or code phrase) underneath or otherwise obscured by the obscuring mechanism. The authentication company 160, for instance Authentix, Inc. of Addison, Tex., may work with the product company 155 to develop a procedure for including the tamper-evident component 110 on the product 105. For example, the authentication company 160 may create the tamper-evident component 110 (or sub-components thereof such as a plurality of phrases used for authentication) and license or sell the tamper-evident component to the product company 155 for inclusion on the product 105 (e.g., as a tag or label comprising the tamper-evident component). The obscuring mechanism obscures the phrase from view. The obscuring mechanism may be a seal or coating (e.g., a scratch-off coating) that may be removed by a user to facilitate authentication of the product 105, or the obscuring mechanism may be a one-time chip reset with a display. The phrase comprises a series of printed plain-language words in an appropriate language. The number of words is sufficient to guarantee that each phrase is unique. For instance, the phrase can be at least five or six words. In addition, the last word in the phrase is a self-checking mechanism that acts as a check on a combination of the other words. For instance, the self-checking mechanism is a checksum, a parity bit, or a series of parity bits. Altering or tampering with the obscuring mechanism, particularly in a way that reveals the phrase, damages the obscuring mechanism so that the alteration or tampering is visibly evident to the consumer 115 and others. The tamper-evident component 110 may be unique for a product type, a product line, or the product company 155. For instance, the size, shape, or color of the tamper-evident component 110 may be unique.

Alternatively, the tamper-evident component 110 is an electronic code available on a webpage or elsewhere, a captcha, security printing such as a peel-off label, a key fob, a radio frequency identification (RFID) tag, or a near field communication (NFC) tag. The key fob provides a single code or new codes for pre-determined periods of time. When the key fob provides new codes, the server 140 is synchronized in time with the smart device 120 so that the server 140 knows the codes for each period of time. The RFID tag and the NFC tag comprise an embedded code that an RFID reader or an NFC reader reads. In addition, the tamper-evident component 110 may comprise a number used once (nonce).

The consumer 115 possesses the product 105 and desires to authenticate of the product 105, for example at a point of sale (e.g., a store or retail merchant) prior to purchasing the product 105 or at a location other than a point of sale subsequent to purchasing the product (e.g., at home following a retail store or online purchase). The consumer 115 also possesses the smart device 120 and uses the smart device to authenticate the product 105. The consumer 115 does so using sight and speech as described below.

The smart device 120 is any suitable smart device or other apparatus. For instance, the smart device 120 is a mobile phone, a tablet computer, a notebook computer, a desktop computer, Amazon Echo, or another Internet-enabled device. The smart device 120 comprises a display 123, a microphone 125, and an authentication application 130. The display 123 is any suitable display that provides graphical information in response to commands from the smart device 120, including the authentication application 130. The microphone 125 receives speech from the consumer 115 and provides that speech to the smart device 120. The smart device 120 records the speech in electronic form. The authentication application 130 functions as described below. The authentication company 160 creates and distributes the authentication application 130. The authentication application 130 may employ a voice activated operating system or voice recognition service such as Alexa Voice Service available from Amazon or Siri Voice Assistant available from Apple.

The network 135 is any network that provides for communication among the components of the system 100. Thus, the network 135 serves as an intermediary between the smart device 120 and the server 140. For instance, the network 135 is the Internet, a mobile telephone network, a local area network (LAN), a wide area network (WAN), or another network. The network 135 provides for communication along any suitable wired or wireless channels.

The server 140 is a hardware computing device that processes data. The server 140 comprises an authentication application 145. The authentication application 145 may be the same as the authentication application 130 in the smart device 120, but perform different functions in the server 140. Alternatively, the authentication application 145 and the authentication application 130 are different applications designed for their respective, cooperative functions in the server 140 and the smart device 120. The authentication application 145 functions as described below. The authentication company 160 may possess or otherwise control the server 140 and create and/or distribute the authentication application 145.

The database 150 is a hardware device or a logical partition of a hardware device that stores data. The server 140 and the database 150 may be separate devices, or alternatively are a single device. The database 150 is associated with the server 140 and the authentication application 145. Specifically, the database 150 stores and provides data at the command of the server 140 and the authentication application 145. For instance, the database 150 comprises the phrase corresponding to the tamper-evident component 110 of the product 105, as well as other phrases (e.g., a plurality of phrases) corresponding to tamper-evident components of other products. In addition, the database 150 comprises a label or other status indicator associated with each phrase. The labels contained within the database indicate whether the phrases have or have not been consumed. The database 150 may also comprise additional authentication information as described herein, for example images of the product 105 or similar products and/or images of the tamper-evident component 110 (e.g., the words comprising the phrase), and one or more images may be associated with each phrase in the database. If the tamper-evident component 110 is unique to the type of the product 105 (e.g., having a unique size, shape, color, etc.), then the image of the product 105 may include the unique tamper-evident component 110 or similar tamper-evident components to provide another basis for authentication by the consumer as described herein (e.g., the consumer can confirm that the unique tamper-evident component 110 set forth in an image provided to the consumer matches that on the possessed product). The authentication company 160 may possess or otherwise control the database 150 and/or the contents thereof (e.g., phrases, labels, images, etc.).

Figure 2A:
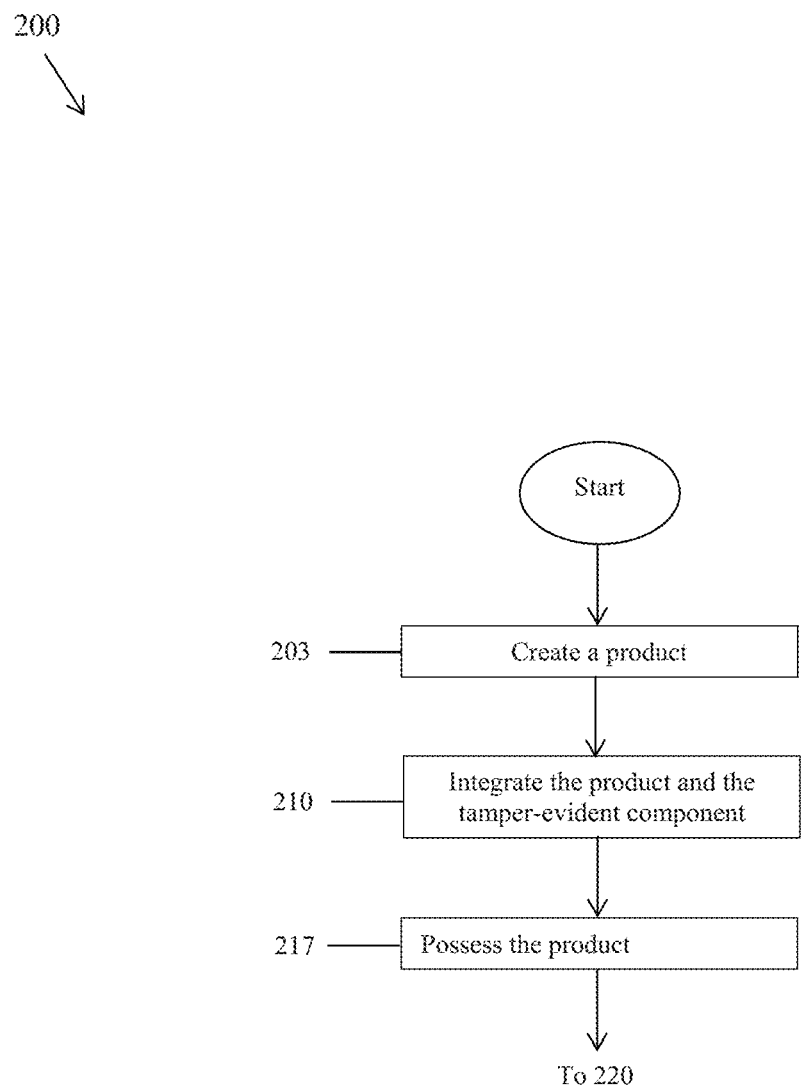
FIGS. 2A-2E are flowcharts illustrating a method of product authentication according to an embodiment of the disclosure.

FIGS. 2A-2E are flowcharts illustrating a method 200 of product authentication according to an embodiment of the disclosure. Turning to FIG. 2A, at step 203, a product is created. The product company 155 creates the product 105 or purchases the product 105 from a third-party manufacturer that creates the product 105. At step 210, the product 105 and the tamper-evident component 110 are integrated (e.g., the tamper-evident component 110 is affixed to the product 105). The product company 155 or a third-party company integrates the product 105 and the tamper-evident component 110. For instance, the product company 155 or the third-party company affixes a tag or label comprising the tamper-evident component 110 to the product 105. The tamper-evident component (and sub-components thereof) may by created about concurrently with the integration thereof to the product 105 (e.g., in real-time), or alternatively the tamper-evident component may be created in advance of the manufacturing of the product and be provided to the product company (or sub-contractor thereof) in batches and held in inventor for use during product manufacturing runs. For example, the authentication company 160 creates the tamper-evident component 110 or may otherwise coordinate with the product company 155 to facilitate inclusion of the tamper-evident component upon the product 105. In an embodiment, creation and/or integration of the tamper-evident component 110 occurs at or near a conclusion of manufacturing in step 203, for example during packaging or labeling of the product 105. The tamper-evident component 110 comprises an obscuring mechanism and a phrase underneath or otherwise obscured by the obscuring mechanism. The phrase comprises a series of plain-language words. The last word in the phrase is a self-checking mechanism. The phrase is stored in the database 150 and is correlated to the product 105. For example, the authentication application 145 instructs the database 150 to store a plurality of unique phrases associated with a given type of product type (e.g., 100 unique phrases associated with a particular product such as a pink designer shoes) and each of these unique phrases is incorporated into the tamper-evident component 110 prior to or concurrent with integration of the tamper-evident component 110 with the product 105.

The database 150 may be updated with additional authentication information that is likewise associated with each phrase or a category of phrases, and such additional information may be returned to the consumer to provide additional bases for authentication by the consumer as described herein (e.g., the consumer can confirm that the additional information provided to the consumer matches that of the possessed product). For example, the authentication application 145 instructs the database 150 to store additional authentication information such as a label associated with each phrase. The label indicates that the phrase has or has not been consumed. Additional authentication information related to the product 105 may include the name of the product company (e.g., ACME Corporation), general product type or category (e.g., women's shoes) or a specific product from a specific company (e.g., ACME Corporation, women's shoes, spring collection, sandals, pink, size 6), and such additional information may be associated with the phrase and stored in the database 150 (e.g., by the authentication application 145). Likewise, additional authentication information may include one or more images of the product 105 that may be associated with a given phrase and stored in the database 150. The authentication application 145 may instruct the database 150 to store one or more images of the particular product (e.g., the pink designer shoes, the tamper-evident component affixed to the product, etc.) associated with the phrase. For example, an image of the product having the tamper-evident component 110 affixed thereto may be taken and transmitted to database 150 for storage and association with the phrase contained within the tamper-evident component (e.g., the product company 155 takes an image of the product 105 during packaging and transmits the image to the authentication company 160). The image may be of the product 105 itself or of a demonstration or representative product that is similar to the product 105 (e.g., a stock photo). In addition, the image may show the product 105 with the integrated tamper-evident component 110 or a similar tamper-evident component (e.g., a stock photo). In that case, the tamper-evident component 110 may be unique for a product type, a product line, or the product company 155. For instance, the size, shape, or color of the tamper-evident component 110 may be unique. In an aspect, the authentication company 160 stores the image in the database 150.

At step 217, the consumer 115 possesses the product, for example at a point of purchase during the process of purchasing the product 105 and/or after completion of a purchase transaction (e.g., upon receiving the product via delivery following an online purchase). Upon possessing the product (e.g., physically possessing the product), the consumer may wish to authenticate the product to provide assurances to the consumer 115 that the product is authentic and not a counterfeit. Such authentication by the consumer may occur at the point of sale location before completing the purchase, or after completion of the purchase (for example, upon the consumer returning home). In a similar manner, the consumer 115 may determine whether the product company 155 recalled the product 105 or whether the product 105 is expired.

Figure 2B:
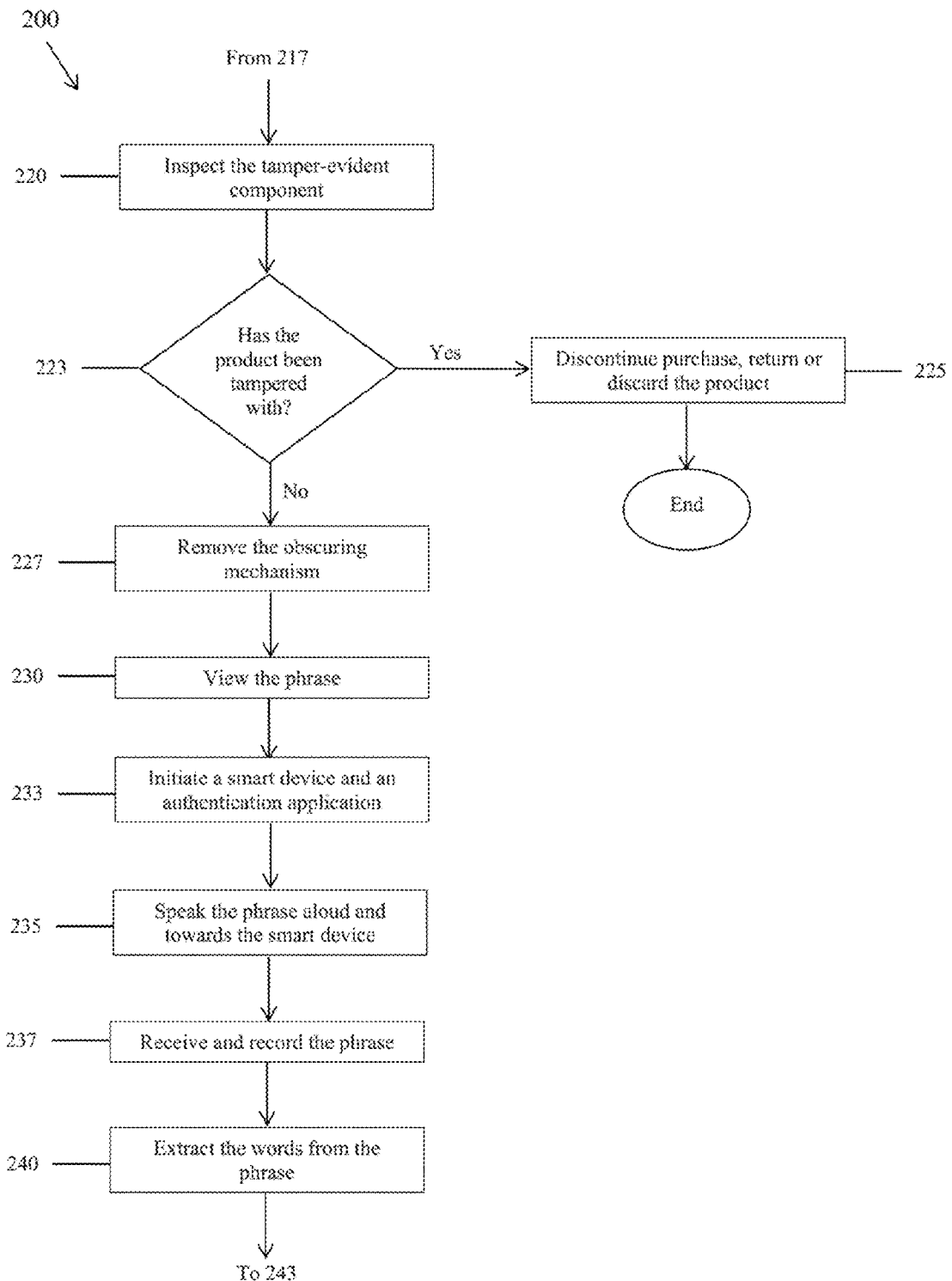

Turning to FIG. 2B, at step 220, the tamper-evident component 110 is inspected by the consumer 115. The consumer 115 inspects for alteration of the tamper-evident component 110. At decision diamond 223, it is determined whether the product has been tampered with (which may provide a first indication of whether the product 105 is authentic). The consumer 115 determines if the obscuring mechanism has been altered, particularly in a way that reveals the phrase. If the result of decision diamond 223 is yes, then the method 200 proceeds to step 225. At step 225, the purchase of the product may be halted or discontinued, and the consumer may alert the merchant and or the product company 155 of the potential tampering or alternation of the product 105. Alternatively, if the purchase has already concluded, the product may be returned or discarded. For example, for a mail order purchase (e.g., shopping via the Internet where the consumer cannot examine the product in advance), the consumer 115 may return the product 105 to the product company 155 or a third-party company that sold the product 105 on behalf of the product company 155, or the consumer 115 discards the product. If the result of decision diamond 223 is no, then the method 200 proceeds to step 227. At step 227, the obscuring mechanism is removed by the consumer 115. For instance, the consumer 115 tears off or scratches off the obscuring mechanism. At step 230, the phrase is viewed by the consumer 115.

At step 233, the consumer 115 initiates the smart device 120 and the authentication application 130. The consumer 115, previously or at this point in the method 200, downloads the authentication application 130 from the server 140 or another server and installs the authentication application 130 on the smart device 120. The smart device 120 is a device such as a mobile phone, and the consumer 115 pushes a touchscreen icon to initiate the authentication application 130. Alternatively, the smart device 120 is a device such as the Amazon Echo and remains initialized along with the authentication application 130. At step 235, the consumer 115 speaks the phrase aloud and in a direction of the smart device 120 (e.g., into or in the direction of the microphone 125). Alternatively, the consumer 115 may type the phrase into the smart device 120 or scan the phrase with the smart device 120 in order to accommodate the speaking impaired or for other reasons such as privacy or quiet environments. If the consumer 115 scans the phrase with the smart device 120, then the smart device 120 may perform optical character recognition (OCR) in order to further process the phrase. At step 237, the smart device 120 receives the phrase from the consumer (e.g., via the microphone 125) and records the phrase. At step 240, the smart device 120 extracts words from the phrase using any suitable voice recognition algorithm. The extraction may be referred to as tokenization.

Figure 2C:
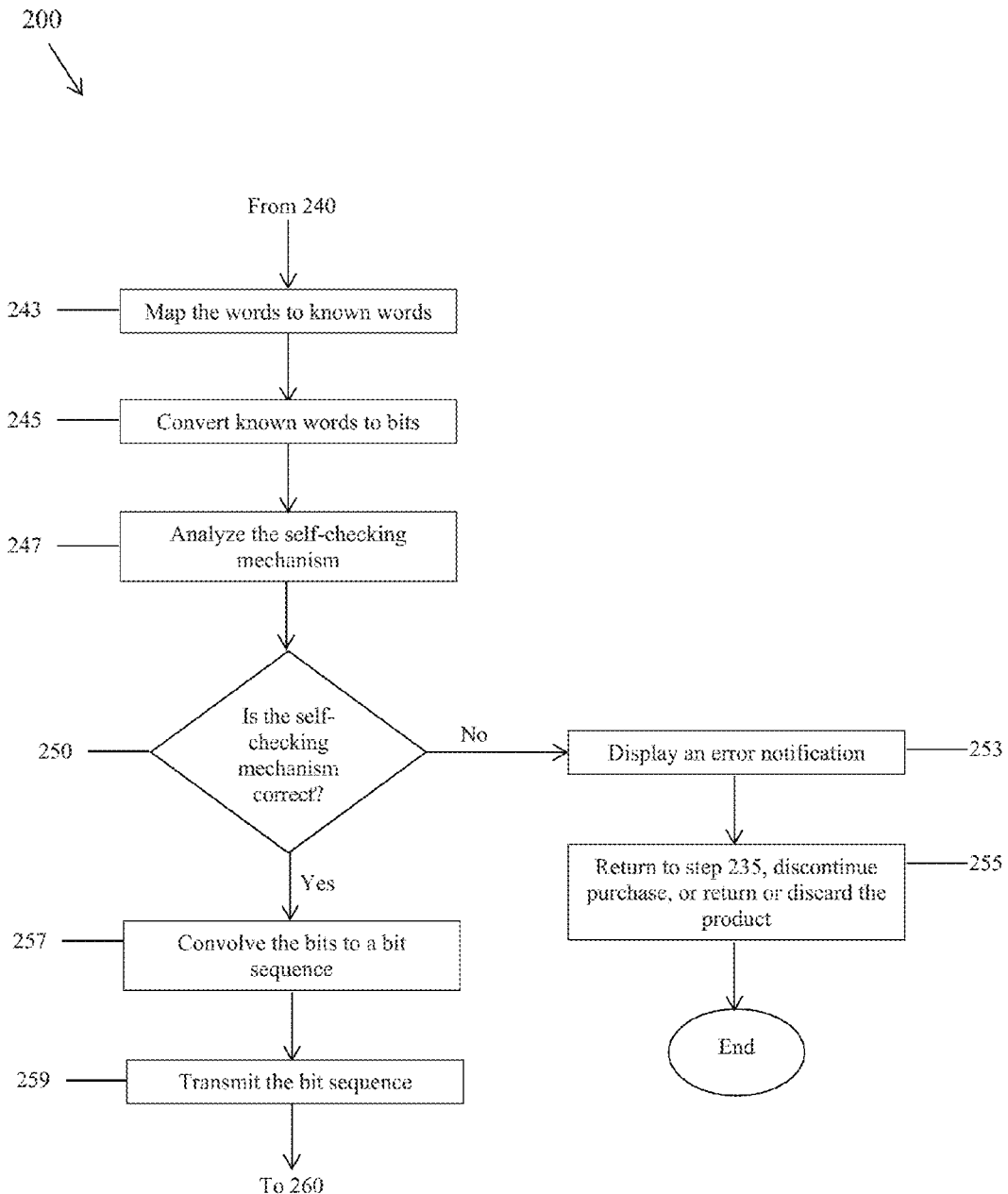

Turning to FIG. 2C, at step 243, the smart device 120 maps the extracted words to corresponding known words. The authentication application 130 may store the known words in the smart device 120 and map the words to the known words using any suitable algorithm. The algorithm may account for a variety of languages, accents, and impediments. At step 245, the authentication application 130 converts the corresponding known words to bits. The conversion may be referred to as serialization and may be used in a self-checking mechanism (e.g., a first pass authentication performed at the local, smart device level based on a summed value of bits corresponding to one or more of the known words).

At step 247, the authentication application 130 analyzes the self-checking mechanism. At decision diamond 250, the authentication application 130 determines if the self-checking mechanism is correct (which may provide a second indication of whether the product is authentic). For instance, if the self-checking mechanism is a checksum, then the authentication application 130 determines whether the bits associated with the last known word in the phrase equal a sum of the bits associated with the remaining known words in the phrase. If the self-checking mechanism is a parity bit or a series of parity bits, then the authentication application 130 makes a first determination as to whether the parity bit or series of parity bits indicates an even or odd number of bits, makes a second determination as to whether the number of one bits or zero bits in the remaining bits is even or odd, compares the first determination to the second determination, and determines whether the self-checking mechanism is correct based on the comparison. For instance, if both the first determination result and the second determination result are odd or if both the first determination result and the second determination result are even, then the self-checking mechanism is correct. Otherwise, it is incorrect. Because the authentication application 130 in the smart device 120 performs step 247 and makes the determination at decision diamond 250, this portion of the authentication occurs locally on the smart device 120 and does not require Internet or other external communication to the server 140 or another server. Thus, this portion of the authentication is relatively fast.

If the result of decision diamond 250 is no, then the method 200 proceeds to step 253. At step 253, an error notification is displayed. For instance, the authentication application 130 instructs the display 123 to display an error notification. Alternatively, the authentication application 130 instructs the smart device 120 to play an audio or other indication of the error notification. At step 255, the method 200 returns to step 235 or the purchase of the product may be halted or discontinued, and the consumer may alert the merchant and or the product company 155 of the potential tampering or alternation of the product 105. Alternatively, if the purchase has already concluded, the product may be returned or discarded. For example, for a mail order purchase (e.g., shopping via the internet where the consumer cannot examine the product in advance), the consumer 115 returns the product 105 to the product company 155 or a third-party company that sold the product 105 on behalf of the product company 155, or the consumer 115 discards the product. If the consumer 115 reaches step 255 a predetermined number of times, for instance two or more, then authentication application 130 may instruct the display 123 to display a support notification indicating that the consumer 115 may call customer support and providing a phone number for the customer support, or the authentication application 130 may instruct the smart device 120 to play an audio or other indication of the support notification. If the result of decision diamond 250 is yes, then the method 200 proceeds to step 257. Before doing so, the authentication application 130 may instruct the display 123 to display an initial authentication notification or instruct the smart device 120 to play an audio or other indication of the initial authentication notification. At step 257, the authentication application 130 convolves the bits into a bit sequence. At step 259, the bit sequence is transmitted. The authentication application 130 instructs the smart device 120 to transmit the bit sequence to the server 140.

Figure 2D:
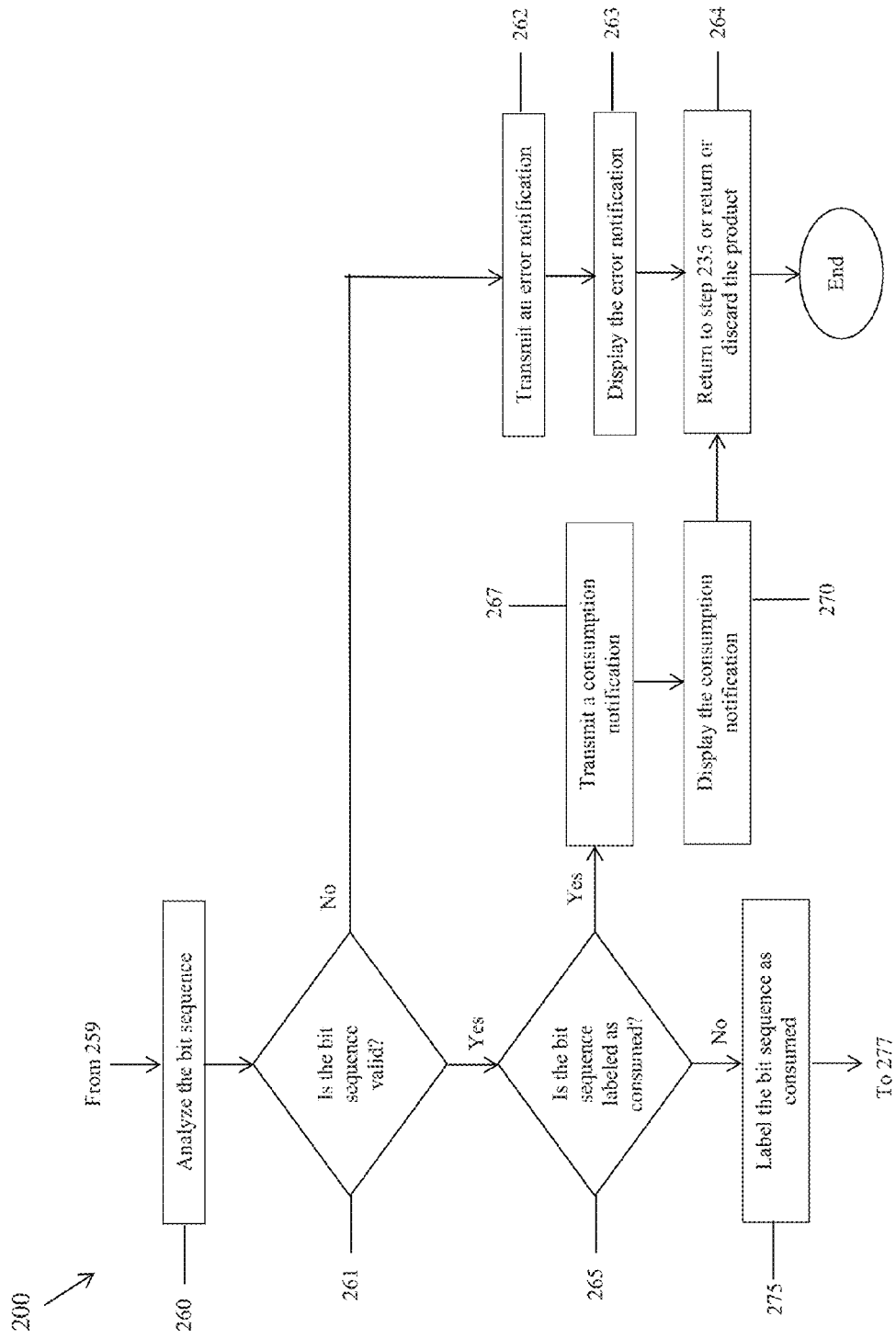
Figure 2E:
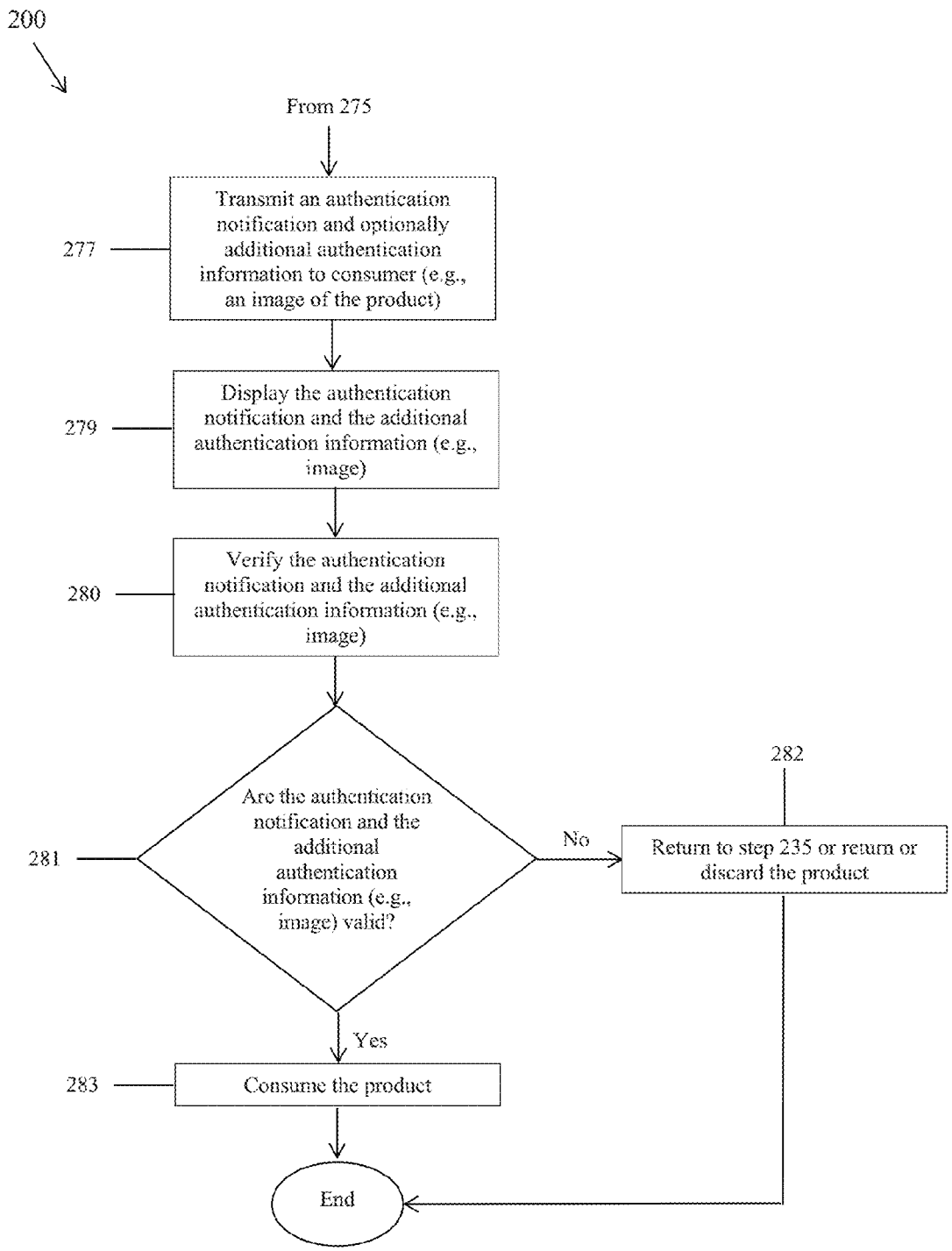

Turning to FIG. 2D, at step 260, the authentication application 145 in the server 140 analyzes the bit sequence to determine if it matches a bit sequence stored in the database 150, thereby confirming that the spoken phrase matches a phrase in the database. That is, the authentication application 145 queries the database 150 to determine if the spoken phrase matches a phrase in the database 150, and if yes, whether a label associated with the phrase indicates that the phrase is consumed. At decision diamond 261, it is determined whether the bit sequence is valid, e.g., whether the bit sequence matches a bit sequence present in the database 150 (which may provide a third indication of whether the product is authentic). If the result of decision diamond 261 is no, then the method 200 proceeds to step 262. At step 262, the authentication application 145 instructs the server 140 to transmit an error notification to the smart device 120 and the authentication application 130. The error notification may indicate an error, that the phrase is not found, and that the consumer 115 may re-speak the phrase. If the consumer 115 receives the error notification a predetermined number of times, for instance two or more, then the authentication application 145 may instruct the server 140 to transmit to the smart device 120 and the authentication application 130 a support notification indicating that the consumer 115 may call customer support and providing a phone number for the customer support. At step 263, an error notification is displayed. For instance, the authentication application 130 instructs the display 123 to display an error notification. Alternatively, the authentication application 130 instructs the smart device 120 to play an audio or other indication of the error notification. At step 264, the method 200 returns to step 235 or the product may be returned or discarded. If the consumer 115 reaches step 264 a pre-determined number of times, for instance two or more, then the authentication application 130 may instruct the display 123 to display a support notification indicating that the consumer 115 may call customer support and providing a phone number for the customer support, or the authentication application 130 may instruct the smart device 120 to play an audio or other indication of the support notification. If the result of decision diamond 261 is yes, then the method 200 proceeds to decision diamond 265.

At decision diamond 265, it is determined whether the bit sequence is labeled as consumed (which may provide a fourth indication of whether the product is authentic). If the result of decision diamond 265 is yes, then the method 200 proceeds to step 267. At step 267, a consumption notification is transmitted. The authentication application 145 instructs the server 140 to transmit the consumption notification to the smart device 120 and the authentication application 130. The consumption notification indicates that the product 105 is inauthentic. At step 270, the consumption notification is displayed to the consumer 115 indicating that the product is not authentic (e.g., a counterfeit). The authentication application 130 instructs the display 123 to display the consumption notification, for example an invalid or void message. Alternatively, the authentication application 130 instructs the smart device 120 to play an audio or other indication of the consumption notification, for example an invalid or void message. After step 270, the method 200 proceeds to step 264. If the result of decision diamond 265 is no, then the method 200 proceeds to step 275. At step 275, the bit sequence is labeled as consumed. The authentication application 145 instructs the database 150 to change the label associated with the phrase so that the label indicates that the phrase is consumed.

Turning to FIG. 2D, at step 277, an authentication notification transmitted to the consumer 115, and the authentication notification may optionally contain additional authentication information that the consumer may verify matches the product 105 in the consumer's possession. For example, the authentication application 145 may instruct the server 140 to transmit an authentication notification and additional authentication information regarding the product to the smart device 120 and the authentication application 130. The authentication notification indicates that the product 105 is authentic and may comprise additional authentication information such as the name of the product company (e.g., ACME Corporation), general product type or category (e.g., women's shoes), a specific product from a specific company (e.g., ACME Corporation, women's shoes, spring collection, sandals, pink, size 6), and/or an image of the product 105. At step 279, the authentication notification and the additional authentication information (e.g., an image) are displayed. The authentication application 130 instructs the display 123 to display the authentication notification and the additional authentication information (e.g., image). Alternatively, the authentication application 130 instructs the smart device 120 to play an audio or other indication of the authentication notification and instructs the display 123 to display the additional authentication information (e.g., image).

At step 280, the authentication notification and the image are verified. For instance, the consumer 115 verifies that the authentication notification indicates that the product 105 is authentication or that the authentication notification accurately describes the product 105, e.g., the consumer 115 verifies that the product company name is correct (e.g., ACME corporation), that the image is of a product and/or tamper-evident component 110 matches that on the product 105 in the consumer's possession, etc. At decision diamond 281, it is determined whether the authentication notification and the additional authentication information (e.g., image) are valid (which may provide a fifth indication of whether the product is authentic). If the result of decision diamond 281 is no, then the method 200 proceeds to step 282. At step 282, the method 200 returns to step 235 or the product may be returned or discarded. If the consumer 115 reaches step 264 a pre-determined number of times, for instance two or more, then the authentication application 130 may instruct the display 123 to display a support notification indicating that the consumer 115 may call customer support and providing a phone number for the customer support, or the authentication application 130 may instruct the smart device 120 to play an audio or other indication of the support notification. If the result of decision diamond 281 is yes, then the method 200 proceeds to step 283. Finally, at step 283, the product is consumed or otherwise used and enjoyed by the consumer for its intended purpose.

Figure 3:
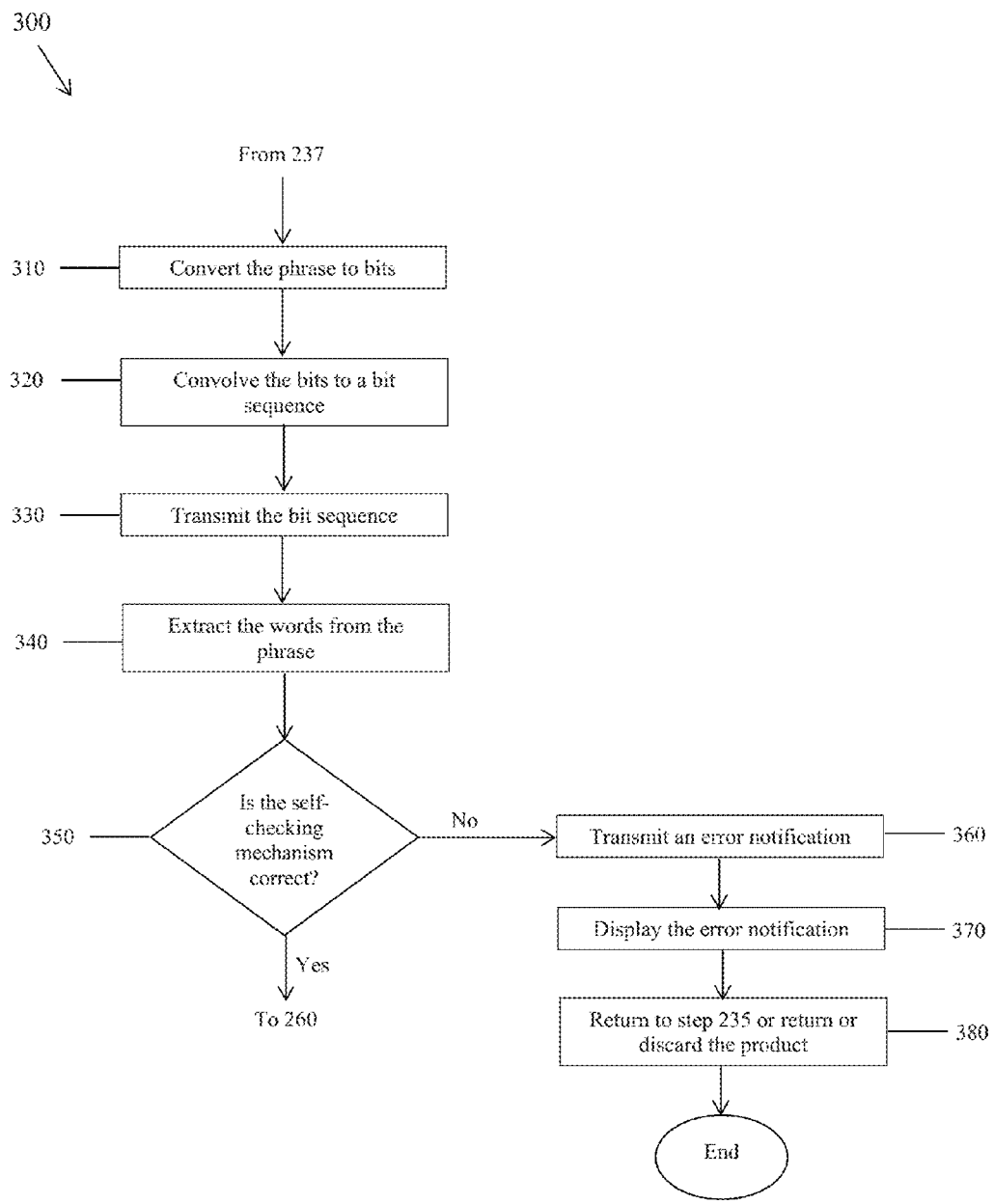
FIG. 3 is a flowchart illustrating a partial method of product authentication according to another embodiment of the disclosure.

FIG. 3 is a flowchart illustrating a partial method 300 of product authentication according to another embodiment of the disclosure. The partial method 300 is an alternative to steps 240 to 259 described above. At step 310, the authentication application 130 converts the phrase to bits. At step 320, the authentication application convolves the bits to a bit sequence. At step 330, the bit sequence is transmitted. The authentication application 130 instructs the smart device 120 to transmit the bit sequence to the server 140. At step 340, the authentication application 145 in the server 140 extracts words from the phrase using any suitable voice recognition algorithm. At decision diamond 350, the authentication application 145 determines if the self-checking mechanism is correct. If the result of decision diamond 350 is yes, then the partial method 300 proceeds to step 260. If the result of decision diamond 350 is no, then the partial method 300 proceeds to step 360.

At step 360, the authentication application 145 instructs the server 140 to transmit an error notification to the smart device 120 and the authentication application 130. The error notification may indicate an error, that the phrase is not accurate, and that the consumer 115 may re-speak the phrase. If the consumer 115 receives the error notification a pre-determined number of times, for instance two or more, then the authentication application 145 may instruct the server 140 to transmit to the smart device 120 and the authentication application 130 a support notification indicating that the consumer 115 may call customer support and providing a phone number for the customer support. At step 370, an error notification is displayed. For instance, the authentication application 130 instructs the display 123 to display an error notification. Alternatively, the authentication application 130 instructs the smart device 120 to play an audio or other indication of the error notification. At step 380, the partial method 300 returns to step 235 or the product may be returned or discarded. If the consumer 115 reaches step 380 a pre-determined number of times, for instance two or more, then the authentication application 130 may instruct the display 123 to display a support notification indicating that the consumer 115 may call customer support and providing a phone number for the customer support, or the authentication application 130 may instruct the smart device 120 to play an audio or other indication of the support notification.

As can be seen, the partial method 300 implements in the server 140 some of the functions that the method 200 implements in the smart device 120. The smart device 120 and the server 140 may share those functions in any suitable combination based on various factors. Those factors include technical practicality, economic practicality, and resources available in the system 100 in general or the smart device 120 and the server 140 in particular.

Figure 4:
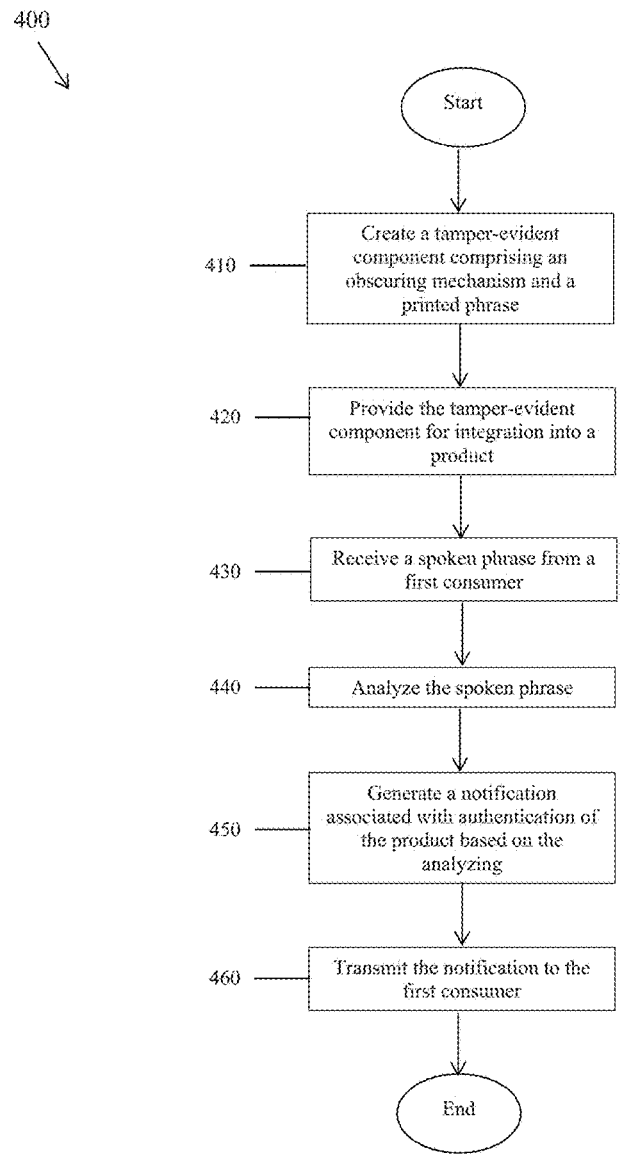
FIG. 4 is a flowchart illustrating a method of product authentication according to an embodiment of the disclosure.

FIG. 4 is a flowchart illustrating a method 400 of product authentication according to an embodiment of the disclosure. The authentication company 160 may perform the method 400 using its resources, including the server 140 and the database 150. At step 410, a tamper-evident component comprising an obscuring mechanism and a printed phrase is created. For instance, the authentication company 160 creates the tamper-evident component 110. The obscuring mechanism obscures the printed phrase from view. At step 420, the tamper-evident component is provided for integration into a product. For instance, the authentication company 160 provides to the product company 155 the tamper-evident component 110 for integration into the product 105. At step 430, a spoken phrase is received from a first consumer. For instance, the authentication application 145 in the server 140 receives the spoken phrase from the consumer 115 via the smart device 120. At step 440, the spoken phrase is analyzed. For instance, the authentication application 145 analyzes the spoken phrase and determines whether the phrase is valid and unconsumed. At step 450, a notification associated with authentication of the product is generated based on the analyzing. For instance, the authentication application 145 generates the notification. Where appropriate, the notification may be an error notification indicating an error, that the phrase is not found, and that the consumer 115 may re-speak the phrase; a consumption notification that the product 105 is inauthentic; or an authentication notification indicating that the product 105 is authentic, which may comprise additional authentication information as described herein (e.g., an image of the product). Finally, at step 460, the notification is transmitted to the first consumer. For instance, the authentication application 145 instructs the server 140 to transmit the notification to the smart device 120 and the authentication application 130.

Figure 5:
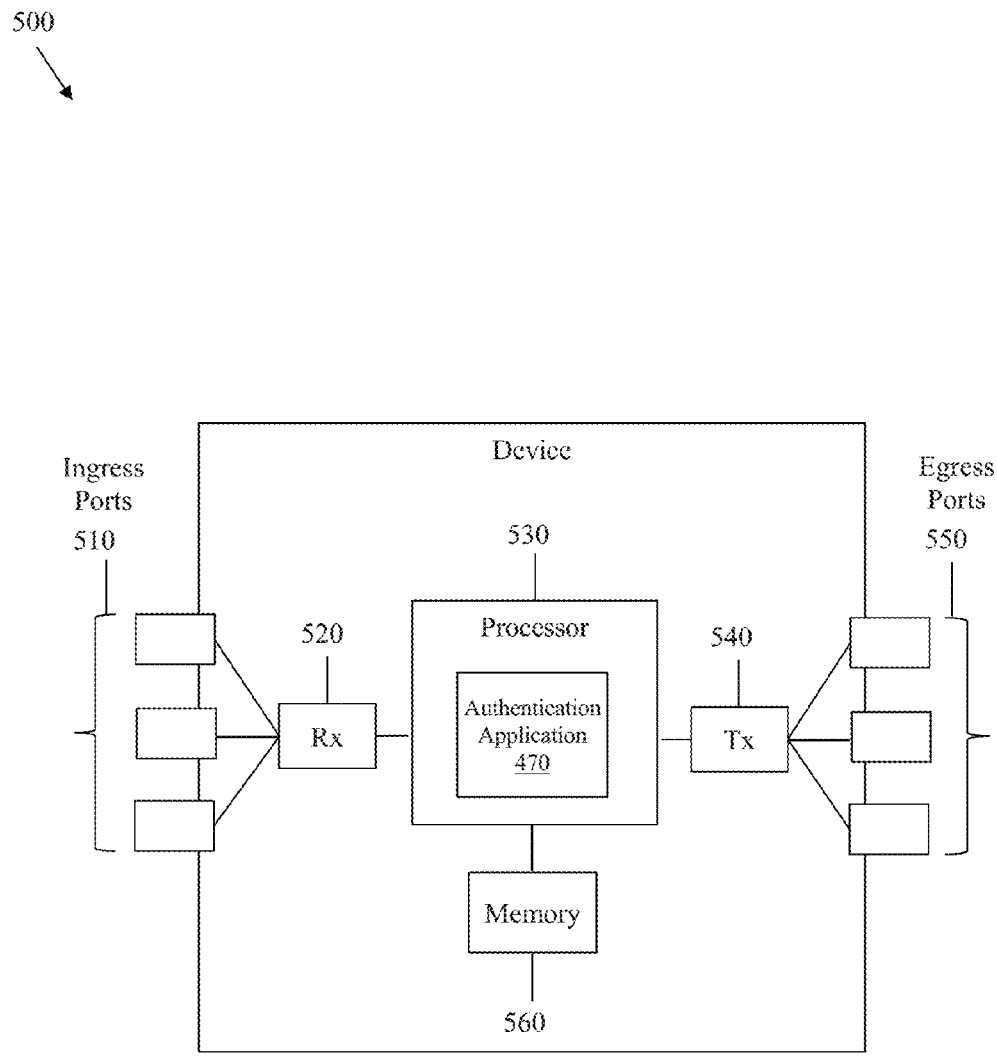
FIG. 5 is a schematic diagram of a device according to an embodiment of the disclosure.

FIG. 5 is a schematic diagram of a device 500 according to an embodiment of the disclosure. The device 500 is suitable for implementing the disclosed embodiments described above such as the smart device 120, the server 140, the database 150, and the methods 200 and 300. The device 500 comprises ingress ports 510 and receiver units (Rx) 520 for receiving data; a processor, logic unit, or central processing unit (CPU) 530 to process the data; transmitter units (Tx) 540 and egress ports 550 for transmitting the data; and a memory 560 for storing the data. The device 500 may also comprise optical-to-electrical (OE) components and electrical-to-optical (EO) components coupled to the ingress ports 510, the receiver units 520, the transmitter units 540, and the egress ports 550 for ingress or egress of optical or electrical signals.

The processor 530 is implemented by any suitable combination of hardware, middleware, firmware, and software. The processor 530 may be implemented as one or more CPU chips, cores (e.g., as a multi-core processor), field-programmable gate arrays (FPGAs), application specific integrated circuits (ASICs), and digital signal processors (DSPs). The processor 530 is in communication with the ingress ports 510, receiver units 520, transmitter units 540, egress ports 550, and memory 560. The processor 530 comprises an authentication application 570. The authentication application 570 implements the disclosed embodiments. The inclusion of the authentication application 570 therefore provides a substantial improvement to the functionality of the device 500 and effects a transformation of the device 500 to a different state. Alternatively, the authentication application 570 is implemented as instructions stored in the memory 560 and executed by the processor 530.

The memory 560 comprises one or more disks, tape drives, and solid-state drives and may be used as an overflow data storage device, to store programs when such programs are selected for execution, and to store instructions and data that are read during program execution. The memory 560 may be volatile and non-volatile and may be read-only memory (ROM), random-access memory (RAM), ternary content-addressable memory (TCAM), and static random-access memory (SRAM).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a memory; and
a processor coupled to the memory and configured to:
receive a spoken phrase associated with a printed phrase from a tamper-evident component of a product;
obtain a notification associated with authentication of the product based on the spoken phrase;
provide the notification in a visual manner, an audio manner, or a combined audio and visual manner; and
obtain an image of the product or a representative product in response to a determination that the product is authentic.

2. The apparatus of claim 1, wherein the processor is further configured to:
record the spoken phrase;
extract words from the spoken phrase; and
map the words to known words.

3. The apparatus of claim 2, wherein a last word of the known words is a self-checking mechanism, and wherein the processor is further configured to determine if the self-checking mechanism is correct.

4. The apparatus of claim 3, wherein, when the self-checking mechanism is incorrect, the notification is an error notification indicating that the self-checking mechanism is incorrect.

5. The apparatus of claim 3, wherein, when the self-checking mechanism is correct, the processor is further configured to:
convert the known words to bits;
convolve the bits to a bit sequence; and
instruct transmission of the bit sequence.

6. The apparatus of claim 5, wherein the processor is further configured to further obtain the notification from a server, and wherein the notification is a consumption notification when the product is inauthentic.

7. The apparatus of claim 5, wherein the processor is further configured to further obtain the notification from a server, and wherein the notification is an authentication notification when the spoken phrase has not been consumed and the product is authentic.

8. The apparatus of claim 7, further comprising a display, wherein the processor is further configured to instruct the display to display the notification.

9. The apparatus of claim 8, wherein the processor is further configured to:
receive additional authentication information related to the product from the server; and
instruct the display to display the additional authentication information.

10. The apparatus of claim 9, wherein the additional authentication information comprises the image.

11. The apparatus of claim 10, wherein the image shows the tamper-evident component integrated into the product or the representative product.

12. The apparatus of claim 7, wherein the server is located remotely from the apparatus.

13. The apparatus of claim 1, wherein the printed phrase is unique to the product.

14. The apparatus of claim 1, wherein the representative product is similar to the product.

15. A method comprising:
creating a tamper-evident component comprising an obscuring mechanism and a printed phrase, wherein the obscuring mechanism obscures the printed phrase from view;
recording the printed phrase in a database;
associating a label with the printed phrase, wherein the label indicates at a time of the associating that the printed phrase has not been consumed; and
recording the label in the database;
providing, after the recording the printed phrase, the associating, and the recording the label, the tamper-evident component for integration into a product;
receiving a spoken phrase from a first consumer;
analyzing the spoken phrase;
generating a notification associated with authentication of the product based on the analyzing; and
transmitting the notification to the first consumer.

16. The method of claim 15, wherein the analyzing comprises determining that the spoken phrase does not match the printed phrase or any other phrase in a database, and wherein the notification is an error notification indicating an error.

17. The method of claim 15, further comprising not receiving, before the receiving the spoken phrase from the first consumer, the printed phrase from a second consumer, wherein the analyzing comprises determining that the spoken phrase is the printed phrase and that the label indicates that the printed phrase has not been consumed as of the time of the analyzing, and wherein the notification indicates that the printed phrase has not been consumed.

18. The method of claim 15, further comprising:
receiving, before the receiving the spoken phrase from the first consumer, the printed phrase from a second consumer; and
changing, after the receiving the printed phrase from the second consumer but before the receiving the spoken phrase from the first consumer, the label to indicate that the printed phrase has been consumed,
wherein the analyzing comprises determining that the spoken phrase is the printed phrase and that the label indicates that the printed phrase has been consumed, and
wherein the notification indicates that the printed phrase has been consumed.

19. The method of claim 18, further comprising:
receiving additional authentication information related to the product; and
transmitting all or a portion of the additional authentication information with the notification.

20. The method of claim 19, wherein the additional authentication information comprises an image of the product or a representative product.

21. The method of claim 20, wherein the image shows the tamper-evident component integrated into the product or the representative product.

22. The method of claim 15, further comprising associating the label with the product.

23. An apparatus comprising:
a memory; and
a processor coupled to the memory and configured to:
instruct recordation of a printed phrase from a tamper-evident component of a product;
associate a label with the printed phrase, wherein the label indicates at a time of the associating that the printed phrase has not been consumed;
instruct recordation of the label;
receive a spoken phrase from a consumer;
perform an analysis of the spoken phrase;
generate a notification associated with authentication of the product based on the analysis;
transmit the notification to the consumer; and
transmit an image of the product or a representative product in response to a determination that the product is authentic.

24. The apparatus of claim 23, wherein the processor is further configured to determine that the spoken phrase does not match the printed phrase or any other phrase, and wherein the notification is an error notification indicating an error.

25. The apparatus of claim 23, wherein the processor is further configured to determine that the spoken phrase does match the printed phrase or another phrase, and wherein the notification indicates whether the printed phrase has or has not been consumed.

26. The apparatus of claim 23, wherein the apparatus is associated with an authentication company, and wherein the apparatus is independent of the consumer.

27. A computer program product comprising computer executable instructions stored on a non-transitory medium that when executed by a processor cause an apparatus to:
receive a spoken phrase associated with a printed phrase from a tamper-evident component of a product;
obtain a notification associated with authentication of the product based on the spoken phrase;

provide the notification in a visual manner, an audio manner, or a combined audio and visual manner; and obtain an image of the product or a representative product in response to a determination that the product is authentic.

* * * * *